EDGAR E. HARDY
INVENTOR.

BY Elmer P. Rucker
ATTORNEY

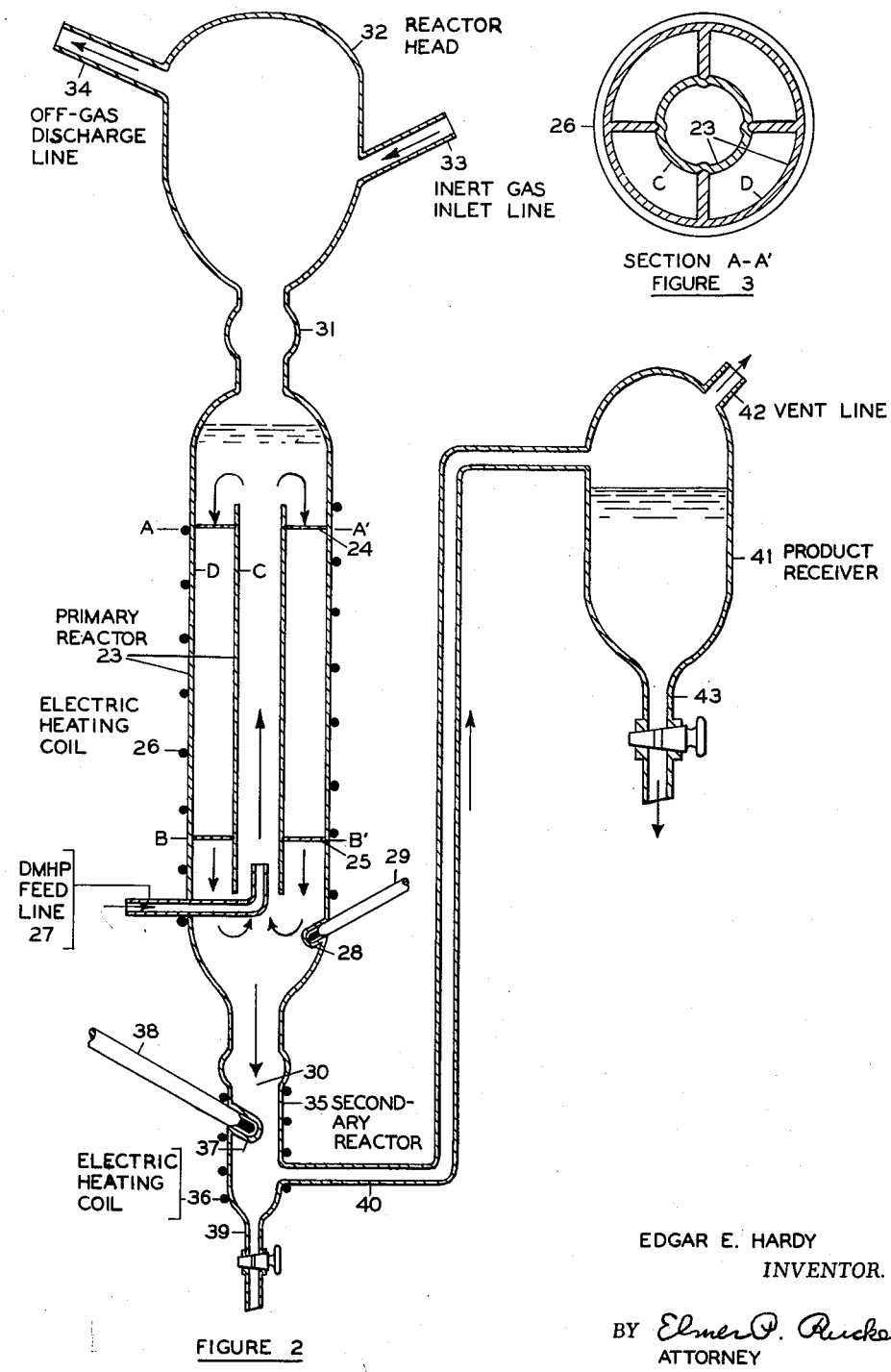

United States Patent Office 2,923,729
Patented Feb. 2, 1960

2,923,729

PYROLYSIS PRODUCTS OF DIMETHYL HYDROGEN PHOSPHITE AND METHOD OF PRODUCING SAME

Edgar E. Hardy, Anniston, Ala., assignor to Monsanto Chemical Company, St. Louis, Mo., a corporation of Delaware Application February 7, 1950, Serial No. 142,737

12 Claims. (Cl. 260—461)

The present invention relates to the product obtained by the pyrolysis of dimethyl hydrogen phosphite and to a novel and improved method of manufacturing same.

An object of the invention is to provide a novel method of producing pyrolyzed dimethyl hydrogen phosphite employing internal circulation whereby mechanical agitation and the attendant stuffing box problems are eliminated, and the corrosion and explosion problems are minimized.

Another object of the invention is to provide a method of producing pyrolyzed dimethyl hydrogen phosphite involving internal circulation whereby substantially improved conversions are obtainable over those of a non-circulating system employing the same feed rates.

Another object of the invention is to provide a method of producing pyrolyzed dimethyl hydrogen phosphite, wherein the reaction or pyrolysis temperature is more readily controlled than in methods not employing a circulating system.

A further object of the invention is to provide a method of making pyrolyzed dimethyl hydrogen phosphite in which a constant product to feed ratio is maintained, thereby avoiding the formation of large excesses or stagnant pools of dimethyl hydrogen phosphite.

A still further object of the invention is to provide an economically and commercially feasible method of making pyrolyzed dimethyl hydrogen phosphite involving internal or mechanical circulation of the reactant and reaction products with continuous recovery of the latter.

Other objects and advantages of the present invention will become apparent to those skilled in the art as the description proceeds.

The pyrolysis products of dimethyl hydrogen phosphite may be treated with thionyl chloride and other chlorinating agents to produce dichloro methyl phosphine oxide in high yields, which compound is an intermediate in the production of derivatives that are highly useful in chemical warfare. Moreover, the above pyrolysis products may be used as starting materials in the production of difluoro phosphine oxide and other warfare chemicals. They are produced by heating the above compound to a temperature within the range of 200° C. to 300° C. and preferably within the range of about 235° C. to 265° C. The reactions involved in the production of these products are not known, but the principal ones are believed to be as follows:

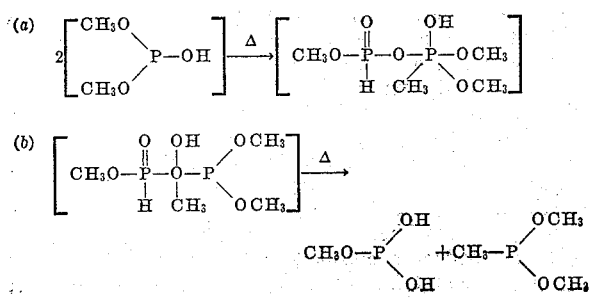

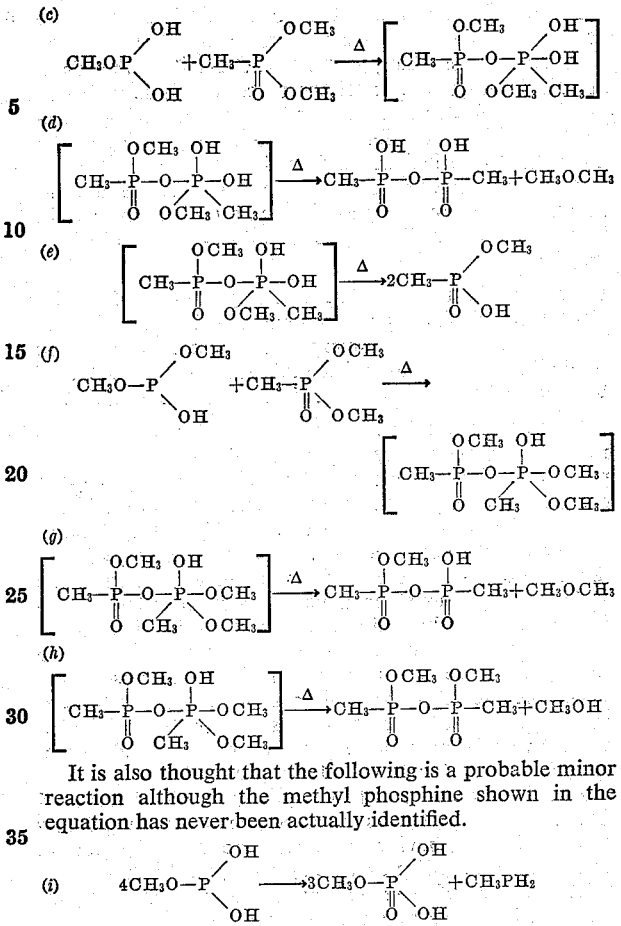

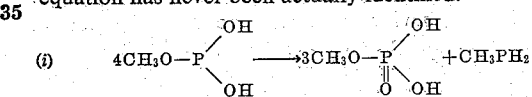

It is also thought that the following is a probable minor reaction although the methyl phosphine shown in the equation has never been actually identified.

(i) $\quad 4CH_3O-P\begin{smallmatrix}OH\\\\OH\end{smallmatrix} \longrightarrow 3CH_3O-P\begin{smallmatrix}OH\\\\OH\end{smallmatrix} + CH_3PH_2$ It is not definitely known whether the above reaction mechanism is correct or not; however, the alkylated products, as well as the formation of methyl alcohol, dimethyl ether, and some unalkylated pentavalent phosphite, all of which are encountered in practice, have been accounted for.

In view of the complexity of the mixture obtained in the pyrolysis of dimethyl hydrogen phosphite, it is essential to provide some means of indicating when a product of the desired quality has been obtained and also when the reaction has proceeded substantially to completion. This is accomplished by determining the "available phosphorus" and trivalent phosphorus contents respectively.

The "available phosphorus" is determined by analyzing the crude pyrolysis product for its total, hydrolyzable and trivalent phosphorus contents and substituting the resulting values in the following equation:

Available phosphorus
$$= \frac{\text{total } P - (\text{trivalent } P + \text{hydrolyzable } P) \times 100}{\text{total } P}$$

The above expression designates that portion of the reaction product corresponding to the organic compounds having a carbon to phosphorus bond, and also that part of the total phosphorus content which is available as an intermediate in the production of dichloro methyl phosphine oxide, difluoro methyl phosphine oxide and other compounds.

As the expression indicates, the total phosphorus content represents the total percentage by weight of phosphorus without regard to the form in which the corresponding compound exists in the complex pyrolysis mixture. The hydrolyzable phosphorus is that portion of the total phosphorus content which hydrolyzes in the presence of boiling HCl and may be quantitatively precipitated with molybdate. The trivalent phosphorus is a measure of unchanged dimethyl hydrogen phosphite in the reactoin product. These last two forms of phosphorus are not available for use in the conversions referred to above.

In carrying out the pyrolysis reaction, it is, therefore, the desideratum to control the reaction conditions so as to yield a product having the highest "available phosphorus content" possible and also a product having a minimum of trivalent and hydrolyzable phosphorus. Stated in a somewhat different manner, it is desirable to carry out the above reaction in such a manner as to yield a crude product having substantially the following specifications.

| | | |
|---|---|---|
| Total phosphorus content | percent | 32.0–35.0 |
| Hydrolyzable phosphorus content | do | 4.1–7.0 |
| Trivalent phosphorus content | do | 0.0–1.50 |
| Available phosphorus content | do | 76.2–88.5 |
| Viscosity in centistokes at 125° C | | 25.0–101 |

It has been previously proposed to carry out the pyrolysis of dimethyl hydrogen phosphite in an agitated pot reactor, but this mode of operation has a number of drawbacks which render it commercially unattractive.

For example, one drawback of the foregoing method is that there is a tendency for dimethyl ether, one of the by-products of the reaction, to escape through the stuffing box around the agitator shaft, thereby rendering the method hazardous due to the explosive nature of the above compound. Another drawback is that the reactant and reaction products are highly corrosive and hence the use of metal equipment of a complicated design creates a substantial corrosion problem. Finally, the above method requires excessively large and expensive equipment for large volume production.

Another method of effecting the pyrolysis of dimethyl hydrogen phosphite has involved the use of a primary tubular reactor having an inlet tube near the bottom and also a take-off tube leading from the bottom thereof to the top of a secondary tubular reactor in which the reaction is carried further to completion. According to this method, the dimethyl hydrogen phosphite is continuously introduced into the bottom of the primary reactor and subjected to pyrolysis to yield a gaseous product including unreacted dimethyl hydrogen phosphite, dimethyl ether, and dimethyl methane phosphonate, which effects mixing of the incoming feed with the liquid pyrolysis product. As soon as the liquid reaction products accumulate in sufficient amounts to produce a static head, they are forced into the top of the secondary reactor to allow the reaction to proceed further to completion, the final product being withdrawn from the secondary reactor into a suitable product receiver.

This method, however, is subject to a number of disadvantages which discourage its use on a commercial scale. Thus, when the pyrolysis reaction is carried out in the above-described manner, it is very difficult, if not impossible, to obtain satisfactory agitation; to maintain a substantially constant product to feed ratio; and/or to effect satisfactory temperature control with the result that relatively low conversions per pass are obtained.

I have developed a relatively simple, economically and commercially feasible method of effecting the pyrolysis of dimethyl hydrogen phosphite in which the above difficulties and disadvantages have been eliminated or substantially reduced. This method comprises continuously feeding dimethyl hydrogen phosphite into a reaction zone containing a cyclically circulating stream of pyrolyzed dimethyl hydrogen phosphite, heating the circulating stream to a temperature within the range of 200° C. to 300° C. to pyrolyze the incoming feed and continuously withdrawing the resulting pyrolysis product from the reaction zone at a rate so correlated with the dimethyl hydrogen phosphite feed as to maintain the reaction volume substantially constant. The continuous flow of pyrolyzed dimethyl hydrogen phosphite is maintained by mechanical or internal circulation, but the latter method is preferred since it eliminates the use of stuffing boxes which are required for agitator shafts and pump seals.

Internal or natural circulation within the meaning of the present specification contemplates the pumping action produced by the volatilization of the incoming feed and/or the gaseous by-product of the pyrolysis reaction. This pumping action may or may not be supplemented by temperature differences in the reactor system.

For a more complete understanding of the present invention reference is made to the accompanying drawings.

Figure 1 is a side elevational view of one embodiment of the instant invention in which the primary reactor consists of two non-concentric tubes so connected together as to permit continuous flow of the pyrolyzed product to and from each tube in the manner shown by the arrows, the continuous flow being produced by internal or natural circulation. The figure also shows the secondary reactor in which the pyrolysis reaction is carried substantially to completion, and the receiver for collecting the pyrolyzed product.

Figure 2 is a side elevation of another embodiment of the instant invention. It is similar in principle to the one shown in Figure 2, except that the primary reactor consists of two concentric tubes, and the secondary reactor is located below the primary reactor instead of parallel thereto.

Figure 3 is a horizontal section taken on line A—A′ of Figure 2, illustrating the upper supporting means 24 for the inner tube C. The horizontal section taken on line B—B′ through the lower supporting means 25 is identical to section A—A′.

Figure 1:
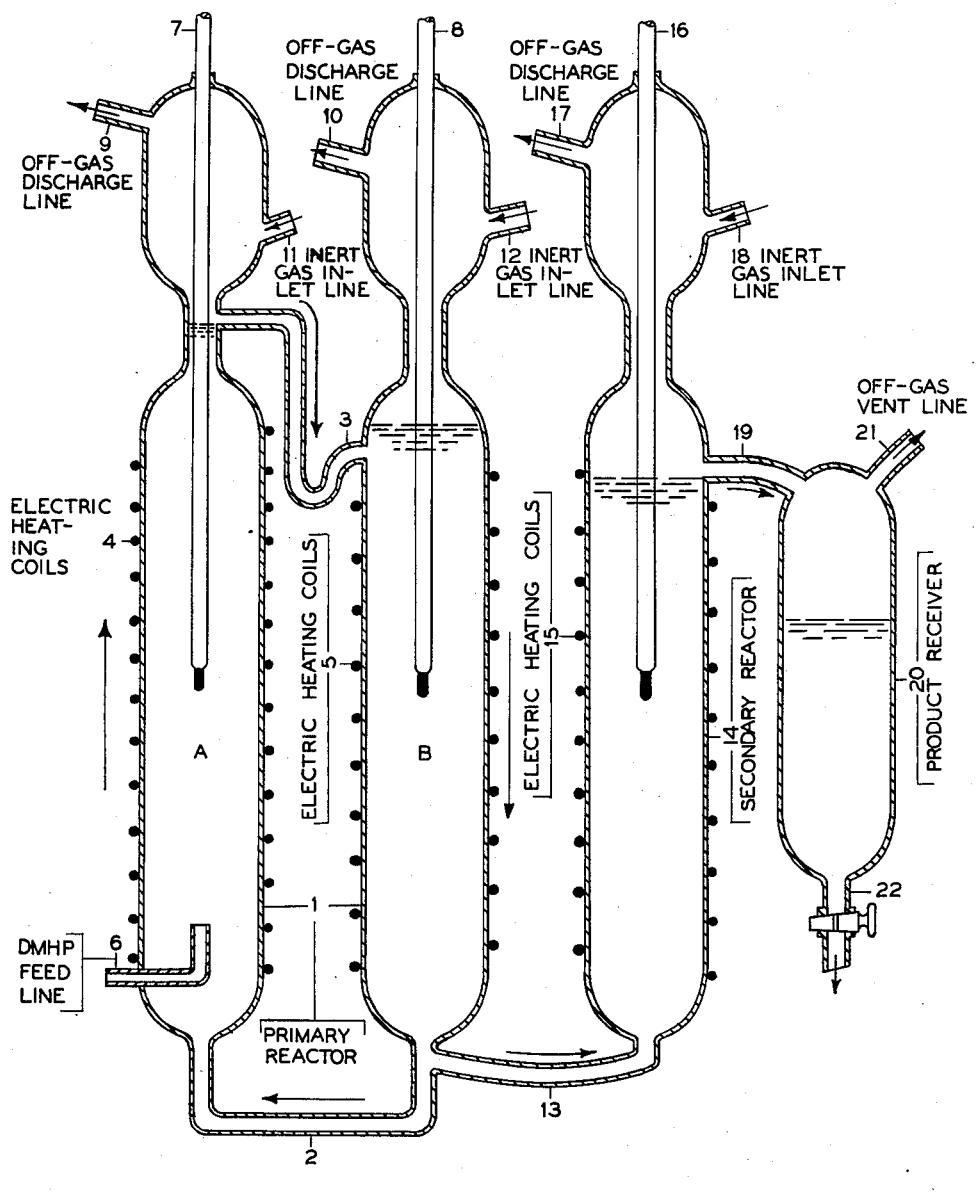

Referring to Figure 1, reference character 1 represents the primary reactor which consists of two tubes, A and B, connected together at the bottom and at a point near the top by lines 2 and 3 respectively. The primary reactor is equipped with electric heating coils 4 and 5, a dimethyl hydrogen phosphite feed line 6, thermometers 7 and 8 for indicating the reaction temperature in tubes A and B respectively, off-gas discharge lines 9 and 10 for allowing the gaseous reaction product to escape from the primary reactor, inert gas inlet lines 11 and 12 for introducing nitrogen into the primary reactor to mix with the gaseous reaction product so as to prevent the latter from forming explosive mixtures with air and a product take-off line 13 leading to the bottom of the secondary reactor 14.

The secondary reactor 14 is provided with electric heating coils 15, a thermometer 16 for recording the reaction temperature, an off-gas discharge line 17 for removing the gaseous reaction product from the reactor, an inert gas inlet line 18 for introducing nitrogen into the reactor to perform the function indicated above and a product delivery line 19 which conveys the pyrolyzed dimethyl hydrogen phosphite into a product receiver 20.

The product receiver 20 is equipped with an off-gas vent line 21 and a stopcock controlled product discharge line 22 from which pyrolyzed dimethyl hydrogen phosphite may be removed as desired.

The nitrogen-containing gaseous reaction product which continuously escapes from lines 9, 10 and 17 is led to a condenser (not shown) to remove condensibles which may be recycled to the primary reactor by way of feed line 6, and the uncondensed gaseous residue is continuously conveyed to a stack (not shown) and vented to the atmosphere.

In practicing the invention in the apparatus shown in Figure 1, the primary reactor is preferably charged up to the indicated level with a heel of pyrolyzed dimethyl hydrogen phosphite. Upon completing this operation, dimethyl hydrogen phosphite is continuously introduced by way of line 6 into the above heel of reaction product and heated by coils 4 and 5 to a temperature of about 200° C. to about 300° C., and preferably to about 250° C. The heat thus applied to the reactor results in volatilization of the incoming dimethyl hydrogen phosphite feed and this in combination with the gaseous product of the pyrolysis reaction creates a gas-lift or pumping action which causes the liquid pyrolyzed product to continuously circulate in the reactor in the manner shown by the arrows. The continued introduction of dimethyl hydrogen phosphite with subsequent pyrolysis results in forcing a portion of the reactant and pyrolysis product over into the secondary reactor 14 which is heated by coils 15 to a temperature within the limits set forth in connection with the primary reactor. The pyrolysis reaction is essentially carried to completion in the secondary reactor and as soon as this reactor fills up to a point just above the discharge line 19, the reaction product flows continuously into product receiver 20.

During the pyrolysis reaction in the primary and secondary reactors, the gaseous reaction product is continuously mixed with nitrogen or another suitable inert gas which is introduced by way of lines 11, 12 and 18 respectively and then led to the above-mentioned condenser (not shown) where the condensibles are separated and returned, if desired, to the primary reactor by way of feed line 6. The uncondensed gaseous residue is continuously conveyed to the above-mentioned vent stack and exhausted into the atmosphere.

Referring to Figures 2 and 3, reference character 23 represents the primary reactor which consists of two concentric tubes, C and D, the former being supported within the latter by suitable means 24 and 25 respectively. The primary reactor is provided with an electric heating coil 26, a dimethyl hydrogen phosphite (DMHP) feed line 27, a thermowell 28 carrying a thermometer 29 for indicating the reaction temperature, an outlet 30 for the liquid pyrolysis product and a gaseous product discharge tube 31 which communicates with a reactor head 32.

The reactor head 32 serves as a collection chamber for the gaseous reaction product. It is provided with an inert gas inlet line 33 for introducing nitrogen or another inert gas to serve the function indicated in connection with Figure 1 and an off-gas discharge line 34 for removing the mixture of nitrogen and gaseous reaction product.

The liquid pyrolysis product is led through outlet 30 into a secondary reactor 35 where the pyrolysis reaction is carried substantially to completion. This reaction is provided with electric heating coils 36, a thermowell 37 carrying a thermometer 38 to indicate the reaction temperature, a stop-cock controlled sample discharge line 39 and a product take-off line 40 leading to a product receiver 41.

The product receiver 41 is equipped with a vent 42 for exhausting relatively small amounts of gaseous reaction product from the system and also a stop-cock controlled product discharge line 43 which permits removal of the pyrolysis product.

The gaseous reaction product continuously leaving line 34 is treated in the same manner described in connection with Figure 1.

The method of practicing the invention in the apparatus illustrated in Figure 2 is substantially identical with that described in connection with Figure 1 and hence a detailed description thereof is unnecessary. The only difference is that in Figure 1 the pyrolysis product is continuously circulated back and forth through tubes A and B, whereas in Figure 2 the circulation is effected in the concentric tubes C and D, the course of the circulation being indicated by the arrows on the drawing.

The natural circulation methods described in connection with the apparatus illustrated in Figures 1 and 2 provide a number of advantages over the non-circulating method hereinbefore described, namely, greater ease of temperature control, better mixing of the feed with the reaction medium, more efficient heat transfer from the reaction medium to the reactant, an increased overall throughput and a markedly increased conversion of feed per pass. These advantages will become apaprent from the following specific examples which illustrate and compare actual results obtained by practicing the above methods, using substantially the same feed rates and reaction temperatures.

*Example I*

Dimethyl hydrogen phosphite was continuously charged into a heel of pyrolyzed dimethyl hydrogen phosphite heated to a temperature of about 250° C. in the primary reactor of Figure 1. The incoming feed was continuously pyrolyzed with the liberation of a gaseous product which caused the above heel and pyrolysis products to circulate within the reactor in the manner shown in the drawing.

The static head of liquid continuously produced in the primary reactor forced a portion of the liquid pyrolysis products and unreacted feed into the secondary reactor where the pyrolysis reaction continued at a temperature of about 250° C. The reaction was carried substantially to completion in the secondary reactor and the resulting products were allowed to flow over into the product receiver.

The sojourn times of the liquid reaction mixture in the primary and secondary reactors were 54 and 110 minutes respectively.

The dimethyl hydrogen phosphite was charged to the primary reactor for a period of 6.25 hours and at an average rate of 7.39 milliliters per minute and at the end of the run a total of only 0.4% of the feed was recovered as condensate from the off-gases, thus indicating a 99.6% conversion of the feed per pass.

The pyrolyzed dimethyl hydrogen phosphite obtained in the above run had substantially the following properties:

| | |
|---|---|
| Total phosphorus_____percent by weight__ | 32.97 |
| Trivalent phosphorus_____do____ | 0.09 |
| Hydrolyzable phosphorus_____do____ | 4.94 |
| Available phosphorus_____do____ | 84.80 |
| Viscosity in centistokes at 125° C_____ | 51.5 |

*Example II*

In this example, the apparatus of Figure 1 was modified by eliminating lines 2 and 3 and substituting in their place a single line leading from the bottom of tube A to a point corresponding to the inlet of line 3 into tube B. It will be seen that by this arrangement internal or natural circulation was eliminated.

Dimethyl hydrogen phosphite was continuously introduced for 6.5 hours at an average rate of 7.76 milliliters per minute into a heel of pyrolyzed dimethyl hydrogen phosphite contained in the reactor of Figure 1 as modified in the manner indicated above. During this operation, the above pyrolyzed product was heated to a temperature of about 250° C. to 255° C. to effect pyrolysis of the incoming feed and as soon as the gas lift produced by the gaseous by-product and volatilized feed was overcome by the static head of accumulated liquid reaction products, the latter were forced over with unreacted feed into the secondary reactor which was maintained at about 250° C. Further pyrolysis took place in the secondary reactor with the liberation of additional gases and the production of more liquid pyrolysis products. These liquid pyrolysis products accumulated in the secondary reactor until the gas lift therein was overcome and then they were forced over into the product receiver.

The sojourn times of the liquid reaction mixture in the primary and secondary reactors were 36 and 70 minutes respectively and the percentage conversion of feed per pass was only 73% of theory as compared with the 99.6% conversion in Example I using natural or internal circulation.

At the end of the above run pyrolyzed dimethyl hydrogen phosphite having the following properties was obtained:

| | | |
|---|---|---|
| Total phosphorus | percent by weight | 33.43 |
| Trivalent phosphorus | do | 0.49 |
| Hydrolyzable phosphorus | do | 5.72 |
| Available phosphorus | do | 81.4 |
| Viscosity in centistokes at 125° C | | 59.2 |

*Example III*

Dimethyl hydrogen phosphite was continuously fed into a heel of pyrolyzed dimethyl hydrogen phosphite which was heated in the primary reactor of Figure 2 to about 250° C. The incoming feed was continuously subjected to pyrolysis with the liberation of a gaseous product which circulated the reaction medium and pyrolyzed products in the manner illustrated in the drawing.

The continued introduction and pyrolysis of dimethyl hydrogen phosphite continuously resulted in the formation of a static head of liquid which overcame the gas lift produced by the gaseous reaction product and volatilized feed. This caused a continuous flow of pyrolyzed products into the secondary reactor where the reaction proceeded substantially to completion at a temperature of about 250° C. and from there the above products were forced over into the product receiver.

The sojourn times of the liquid reaction mixture in the primary and secondary reactors were 57 and 12 minutes respectively.

The dimethyl hydrogen phosphite was fed into the primary reactor for approximately 7.6 hours at an average rate of 7.75 mil. per minute. The percentage conversion of feed per pass was 94% as compared with 73% of theory obtained with the non-circulating system of Example II.

The product of the above pyrolysis reaction was characterized by the following properties:

| | | |
|---|---|---|
| Total phosphorus | percent by weight | 32.48 |
| Trivalent phosphorus | do | 1.19 |
| Hydrolyzable phosphorus | do | 4.99 |
| Available phosphorus | do | 80.90 |
| Viscosity in centistokes at 125° C | | 32.03 |

*Example IV*

The method of preparing pyrolysis products of dimethyl hydrogen phosphite as described in Example I was followed using the following operating conditions:

| | | |
|---|---|---|
| Dimethyl hydrogen phosphite feed rate | mil./min | 6.65 |
| Reaction temperature | ° C | 260 |
| Sojourn time in primary reactor | minutes | 59 |
| Sojourn time in secondary reactor | do | 25 |
| Length of run | do | 348 |

The conversion of feed per pass in the above run was 90.5% of theory.

*Example V*

The run described in Example II was repeated using the following operating conditions.

| | | |
|---|---|---|
| Dimethyl hydrogen phosphite feed rate | mil./min | 6.65 |
| Reaction temperature | ° C | 260 |
| Sojourn time in primary reactor | minutes | 84 |
| Sojourn time in secondary reactor | do | 36 |
| Length of run | do | 60 |

The conversion of feed per pass in this run was only 62.7% of theory.

Referring to the above examples, it will be noted that by the use of natural circulation, the percentage conversion of feed per pass was increased from 21% to 27.6% over that obtained with the non-circulating system described in Example II.

Moreover, the natural cicrulation methods of Examples I, III and IV provided the advantages of ease of temperature and operational control and consequently required little or no attention. In contrast thereto, with the non-circulating system of Examples II and V, it was very difficult to maintain the reaction temperature within 5 to 10 degrees of the desired temperature. In addition, it was very hard to control the reaction so as to ensure smooth operation as considerable pumping and siphoning of the product occurred.

As indicated earlier herein, mechanical circulation may be used in place of natural circulation, but it is much less desirable since it involves the use of pumps which require stuffing boxes and the latter present the problem of leakage of the gaseous reaction product with the attendant hazards due to the explosive nature of dimethyl ether, one of the components of the above product.

The various conditions of operation of the present method will now be considered in detail.

In accordance with the present invention, the pyrolysis of dimethyl hydrogen phosphite is carried out at a temperature of about 200° C. to about 300° C., and preferably at a temperature within the range of 235° C. to 265° C. At this time, the optimum reaction temperature appears to be about 250° C., but this will, of course, vary with the size and type of apparatus and the other operating conditions such as sojourn times, feed rates, etc.

In the specific examples, the reaction temperatures in both the reactors were substantially identical, but it is within the scope of the instant invention to have them differ substantially from each other so long as neither temperature falls outside the limits specified above. In actual practice using somewhat larger equipment, the temperature in the secondary reactor is from 10 to 50 degrees higher than that existing in the primary reactor.

The dimethyl hydrogen phosphite feed rate which should be used depends upon the type and size of the equipment and also on the other operating conditions. However, in order to illustrate feed rates which have been successfully employed in the apparatus illustrated in Figures 1 and 2, the following experimental data are supplied:

| Run No. | Reaction Temp., ° C. | Length Of Run, Min. | Sojourn Time, Minutes | | DMHP Feed Rate, cc./min. | Percent Conversion of Feed Per Pass | Percent P In Product As Available P |
|---|---|---|---|---|---|---|---|
| | | | Total | In Finisher | | | |
| 1 | 230–235 | 455 | 271 | 180 | 4.52 | 95.5 | 84.5 |
| 2 | 230–235 | 455 | 170 | 85 | 4.86 | 97.0 | 84.2 |
| 3 | 250–255 | 455 | 84 | 25 | 6.31 | 94.8 | 82.5 |
| 4 | 245–250 | 600 | 175 | 117 | 6.84 | 93.4 | 85.0 |
| 5 | 245–250 | 410 | 160 | 107 | 7.56 | 99.6 | 85.8 |
| 6 | 260–265 | 455 | 84 | 25 | 6.60 | 86.6 | 83.9 |

The following data show various dimethyl hydrogen phosphite feed rates with the results obtained when practicing the process of the instant invention on pilot plant scale:

| Run No. | DMHP Feed Rate, Pounds/Hr. | Reaction Temp., ° C. | Conversion Per Pass, Percent of Feed | Conversion of Feed, Pounds/Hr. |
|---|---|---|---|---|
| 1 | 6 | 250–253 | 99.3 | 5.95 |
| 2 | 9.6 | 258–260 | 97.8 | 9.38 |
| 3 | 12.6 | 247–250 | 85.5 | 10.8 |
| 4 | 15 | 248–250 | 82.4 | 12.35 |
| 5 | 20 | 250–255 | 78.2 | 15.6 |
| 6 | 28 | 245–250 | 62.6 | 17.5 |

The above table indicates that the conversion per pass tends to decrease as the feed rate is increased but that the overall throughput is increased. It also shows that under the conditions used satisfactory results are obtainable with feed rates as high as 28 pounds per hour; and also that about 15 to 20 pounds per hour is the most practical one to use since the percentage conversion of feed per pass is noticeably decreased when the feed rate exceeds 20 pounds per hour. However, since this is a variable which will vary with larger or smaller equipment and with different operating conditions, it will serve no useful purpose to attempt to generically define the feed rates here. It is sufficient to state that the optimum or most practical feed rate is readily ascertainable by those skilled in the art.

The sojourn time as used in the present specification is the residence time of the liquid reaction mixture in the reactor system. This is broken down into two parts, namely, the average residence times in the primary and secondary reactors respectively.

The sojourn time which should be employed in the primary and secondary reactors varies inversely with the temperature, that is, the higher the temperature the lower the sojourn time and vice versa. Moreover, the sojourn time which is used in one reactor depends upon that employed in the other reactor. For example, if at a given temperature a long sojourn time is employed in the primary reactor, then only a relatively short one need be adopted for the secondary reactor. On the other hand, the converse of this is true when a short sojourn time is employed in the primary reactor.

In general, at any given temperature, it is desirable that the sojourn time in the primary reactor be of sufficient duration to effect pyrolysis of about 65% to 95% of the dimethyl hydrogen phosphite feed and that the sojourn time in th secondary reactor be long enough to substantially complete the pyrolysis. Stated differently, at any given temperature the sojourn time in the reactor system should be sufficiently long to convert the dimethyl hydrogen phosphite to a point where it constitutes not more than 2% and preferably less than 0.2% of the total liquid pyrolysis product.

Variations in the conditions under which the present method is operated, depending upon the nature and size of the equipment and the other factors involved, are contemplated as being within the scope of the present invention and the invention is not to be construed as being limited to the specific conditions or apparatus described in the examples except as defined in the appended claims.

What I claim is:

1. The method of producing pyrolysis products, which comprises continuously feeding dimethyl hydrogen phosphite into a reaction zone containing a cyclically circulating stream of pyrolyzed dimethyl hydrogen phosphite, heating said stream to a temperature within the range of about 200° C. to about 300° C. to effect pyrolysis of the incoming feed and continuously withdrawing the resulting pyrolyzed product from said reaction zone, said pyrolysis being carried out for a period of time sufficient to yield a product containing less than 2% by weight of unreacted dimethyl hydrogen phosphite.

2. The method of producing pyrolysis products as defined in claim 1 wherein the pyrolysis reaction is carried out at a temperature of about 235° C. to 265° C.

3. The method of producing pyrolysis products as defined in claim 1 wherein the pyrolyzed product is continuously circulated by the pumping action produced by the gaseous product liberated as a result of the pyorlysis reaction.

4. The method of producing pyrolysis products, which comprises continuously feeding dimethyl hydrogen phosphite into a primary reaction zone containing a cyclically circulating stream of pyrolyzed dimethyl hydrogen phosphite, heating said circulating stream to a temperature within the range of 235° C.–265° C. to effect pyrolysis of a substantial amount of said incoming feed, continuously conducting a portion of said circulating stream into a secondary reaction zone maintained at a temperature within the above limits to substantially complete the pyrolysis reaction and continuously withdrawing the resulting pyrolyzed product from said secondary reaction zone, said pyrolysis in said reaction zones being carried out for a total period of time sufficient to yield a product containing less than 2% by weight of unreacted dimethyl hydrogen phosphite.

5. The method defined in claim 4, wherein the pyrolysis reaction is effected at a temperature of about 245° C.

6. The method of producing pyrolysis products, which comprises continuously feeding dimethyl hydrogen phosphite into a reaction zone containing a cyclically circulating stream of pyrolyzed dimethyl hydrogen phosphite, heating said stream to a temperature within the range of about 200° C. to about 300° C. to effect pyrolysis of the incoming feed and continuously withdrawing the resulting pyrolyzed product from said reaction zone, said pyrolysis being carried out for a period of time sufficient to yield a product containing less than 0.2% by weight of unreacted dimethyl hydrogen phosphite.

7. The method of producing pyrolysis products, which comprises continuously feeding dimethyl hydrogen phosphite into a reaction zone containing a cyclically circulating stream of pyrolyzed dimethyl hydrogen phosphite, heating said stream to a temperature within the range of about 200° C. to about 300° C. to effect pyrolysis of the incoming feed and continuously withdrawing the resulting pyrolyzed product from said reaction zone, said pyrolysis being carried out for a period of time sufficient to yield a product containing about 0% to about 1.5% by weight of trivalent phosphorus.

8. The method of producing pyrolysis products, which comprises continuously feeding dimethyl hydrogen phosphite into a primary reaction zone containing a cyclically circulating stream of pyrolyzed dimethyl hydrogen phosphite, heating said circulating stream to a temperature within the range of 235° C. to 265° C. to effect pyrolysis of the incoming feed, continuously conducting a portion of said circulating stream into a secondary reaction zone maintained at a temperature within the above limits to substantially complete the pyrolysis reaction and continuously conducting the resulting pyrolysis product from said secondary reaction zone, said pyrolysis in said primary and secondary reaction zones being carried out for a total period of time sufficient to yield a product containing less than 2% by weight of unreacted dimethyl hydrogen phosphite.

9. The method of producing pyrolysis products, which comprises continuously feeding dimethyl hydrogen phosphite into a primary reaction zone containing a cyclically circulating stream of pyrolyzed dimethyl hydrogen phosphite, heating said circulating stream to a temperature within the range of 235° C. to 265° C. to effect pyrolysis of the incoming feed, continuously conducting a portion of said circulating stream into a secondary reaction zone maintaind at a temperature within the above limits to substantially complete the pyrolysis reaction and continuously conducting the resulting pyrolysis product from said secondary reaction zone, said pyrolysis being carried out in said primary reaction zone for a period of time sufficient to effect pyrolysis of about 65% to about 95% of said dimethyl hydrogen phosphite feed.

10. The method of producing pyrolysis products, which comprises continuously feeding dimethyl hydrogen phosphite into a primary reaction zone containing a cyclically circulating stream of pyrolyzed dimethyl hydrogen phosphite, heating said circulating stream to a temperature of about 250° C. to effect pyrolysis of the incoming feed, continuously conducting a portion of said circulating stream into a secondary reaction zone maintained at a temperature of about 250° C. to substantially complete the pyrolysis reaction and continuously conducting the resulting pyrolyzed product from said secondary reaction zone, said pyrolysis in said primary and secondary reaction zones being carried out for a total period of time sufficient to yield a product containing about 0.09% by weight of unreacted dimethyl hydrogen phosphite.

11. The method of producing pyrolysis products, which comprises continuously feeding dimethyl hydrogen phosphite into a primary reaction zone containing a cyclically circulating stream of pyrolyzed dimethyl hydrogen phosphite, heating said circulating stream to a temperature of about 250° C. to effect pyrolysis of the incoming feed, continuously conducting a portion of said circulating stream into a secondary reaction zone maintained at a temperature of about 250° C. to substantially complete the pyrolysis reaction and continuously conducting the resulting pyrolyzed product from said secondary reaction zone, said pyrolysis in said primary and secondary reaction zones being carried out for a total period of time sufficient to yield a product containing about 1.2% by weight of unreacted dimethyl hydrogen phosphite.

12. The method of producing pyrolysis products, which comprises continuously feeding dimethyl hydrogen phosphite into a primary reaction zone containing a cyclically circulating stream of pyrolyzed dimethyl hydrogen phosphite, heating said circulating stream to a temperature of about 260° C. to effect pyrolysis of the incoming feed, continuously conducting a portion of said circulating stream into a secondary reaction zone maintained at a temperature of about 260° C. to substantially complete the pyrolysis reaction and continuously conducting the resulting pyrolysis product from said secondary reaction zone, said pyrolysis in said primary and secondary reaction zones being carried out for a total period of time sufficient to yield a product containing less than 2% by weight of unreacted dimethyl hydrogen phosphite.

No references cited.

UNITED STATES PATENT OFFICE
CERTIFICATE OF CORRECTION

Patent No. 2,923,729            February 2, 1960

Edgar E. Hardy

It is hereby certified that error appears in the printed specification of the above numbered patent requiring correction and that the said Letters Patent should read as corrected below.

Column 1, lines 69 to 72, the right-hand portion of formula (b) should appear as shown below instead of as in the patent:

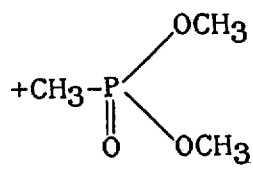

column 2, line 43, for "phosphite," read -- phosphate, --; column 5, line 47, for "reaction" read -- reactor --; column 9, line 28, for "th" read -- the --; line 60, for "pyorlysis" read -- pyrolysis --.

Signed and sealed this 16th day of August 1960.

(SEAL)
Attest:

KARL H. AXLINE
Attesting Officer

ROBERT C. WATSON
Commissioner of Patents